United States Patent [19]

Shauman

[11] Patent Number: 4,827,699
[45] Date of Patent: May 9, 1989

[54] AGRICULTURAL BALE WRAPPER

[76] Inventor: Kevin J. Shauman, R.R. - Box 451, Oquawka, Ill. 61469

[21] Appl. No.: 170,235

[22] Filed: Mar. 18, 1988

[51] Int. Cl.$^4$ .............................................. B65B 13/02
[52] U.S. Cl. ........................................ 53/587; 53/211; 242/75.4; 242/156.1
[58] Field of Search ................. 53/556, 587, 588, 211; 292/75.4, 156.1

[56] References Cited

U.S. PATENT DOCUMENTS

| | | | |
|---|---|---|---|
| 345,468 | 7/1886 | Wilmott | 242/75.4 |
| 2,596,428 | 5/1952 | O'Malley | 242/75.4 |
| 3,482,800 | 12/1969 | Barnett | 242/75.4 X |
| 4,077,179 | 3/1978 | Lancaster | 53/211 X |
| 4,110,957 | 9/1978 | Lancaster | 53/556 X |
| 4,343,132 | 8/1982 | Lawless, Jr. | 53/587 X |
| 4,606,172 | 8/1986 | Miller | 53/587 X |
| 4,662,151 | 5/1987 | Mathes | 53/587 |

Primary Examiner—John Sipos
Attorney, Agent, or Firm—Wm. T. Metz

[57] ABSTRACT

An agricultural bale wrapper having a frame with hitches thereon for attachment to a 3 point hitch of a tractor. The frame has fastened thereto a means to stab and rotate an agricultural bale. The 3 point hitch of the tractor lifts the agricultural bale and a hydraulic system rotates the stabbing mechanism for the agricultural bale. The frame also has fastened to it a means to support a roll of plastic sheeting so that the plastic sheeting may be wrapped onto the agricultural bale as the rotation mechanism is rotating the agricultural bale. The frame also has fastened to it a braking mechanism to stretch the plastic sheeting tightly around the agricultural bale as the rotation mechanism is rotating the agricultural bale.

4 Claims, 4 Drawing Sheets

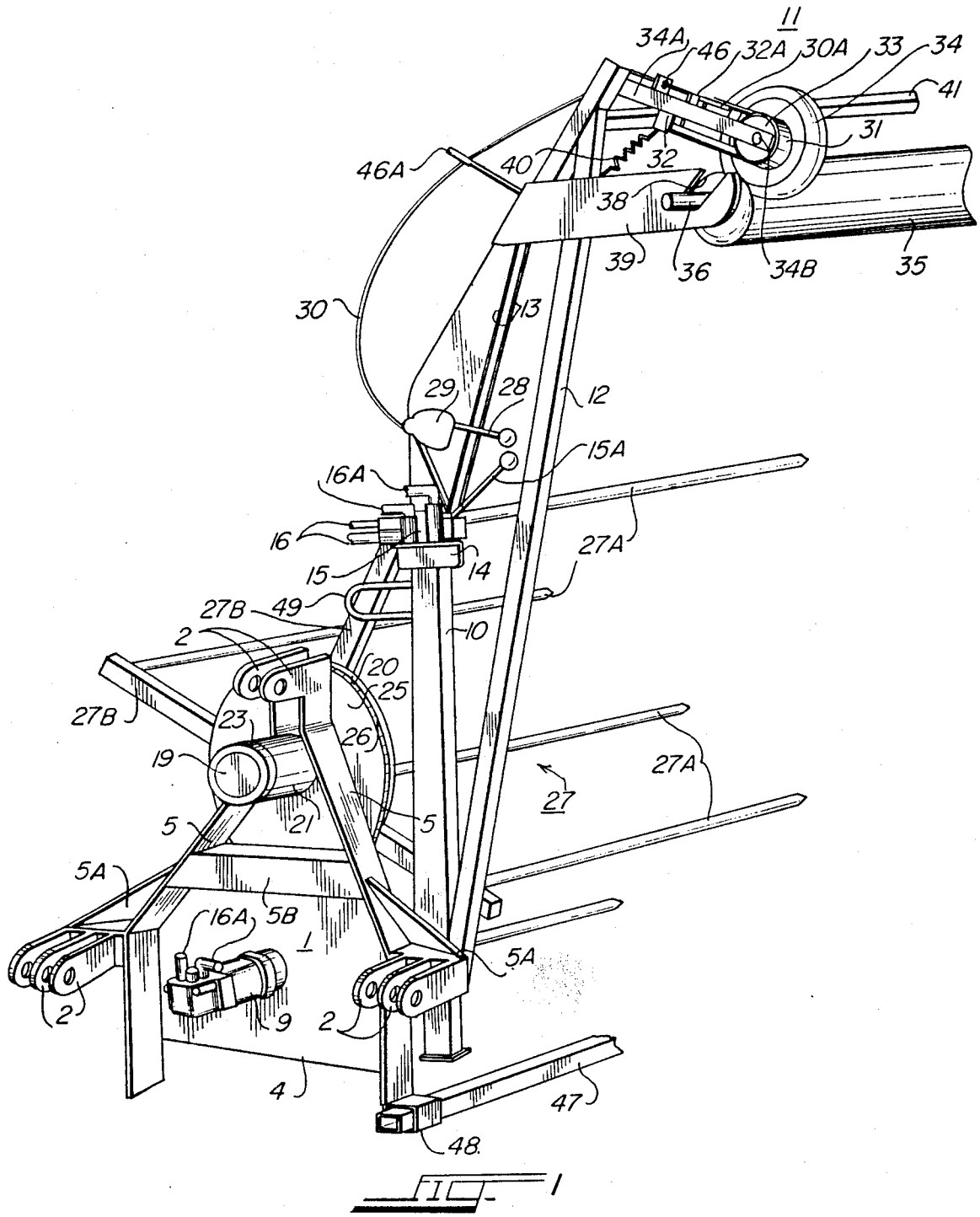

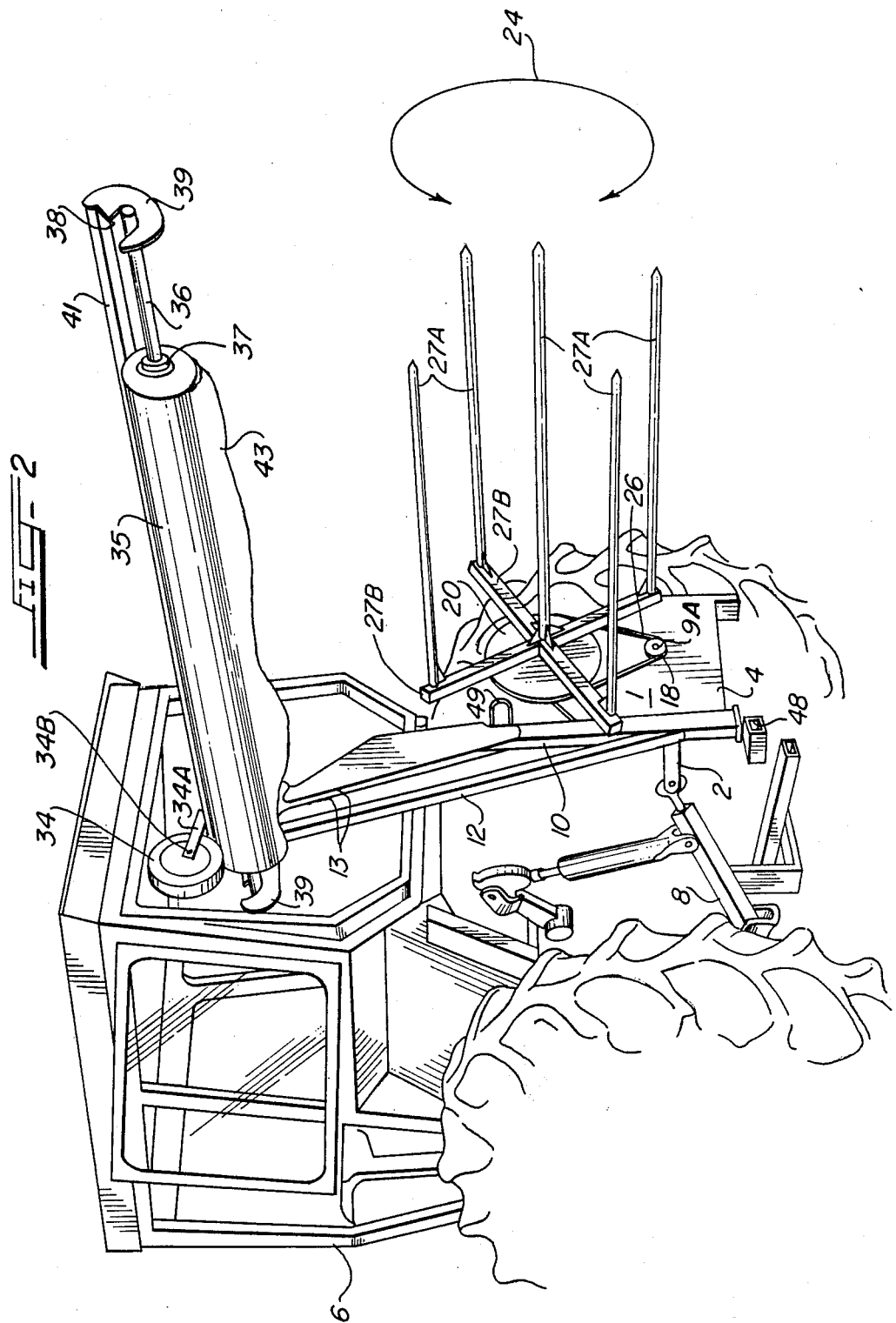

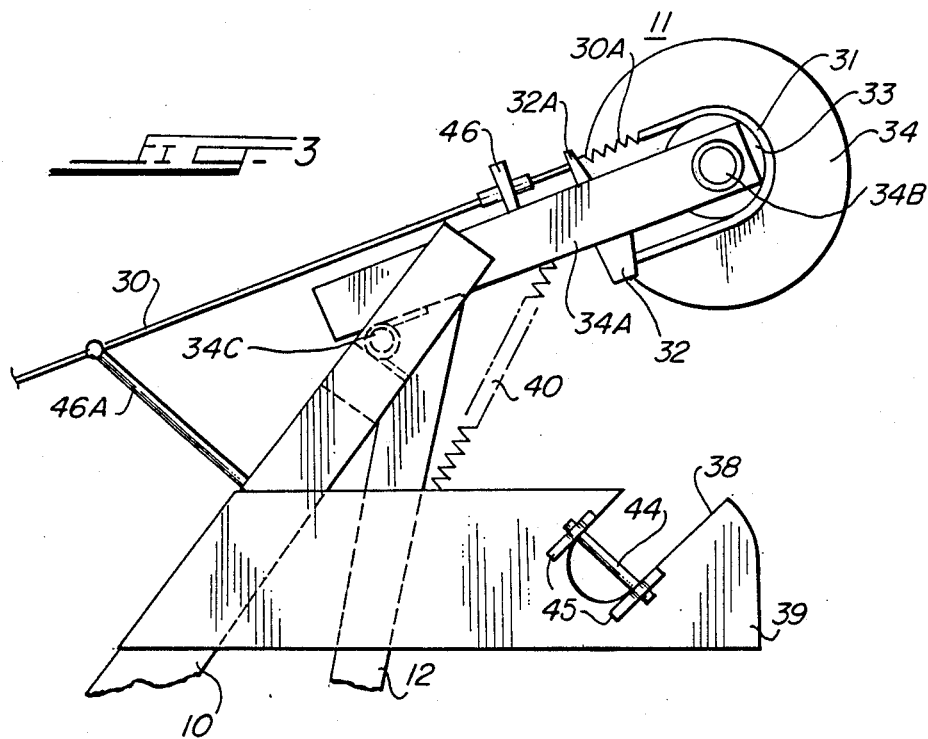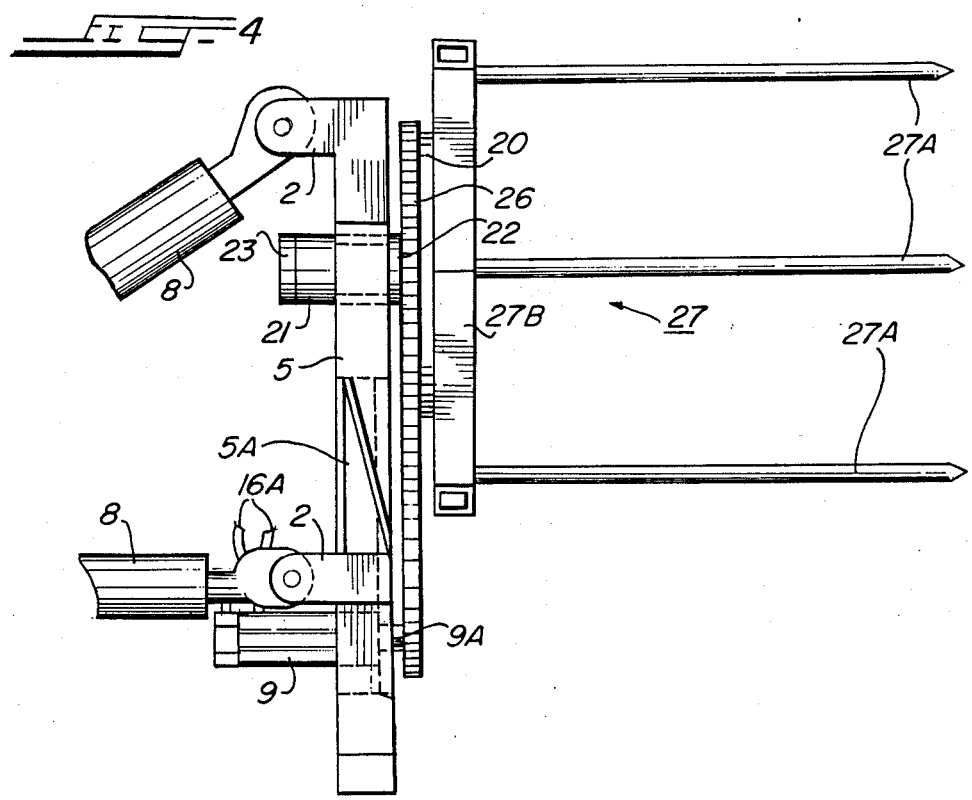

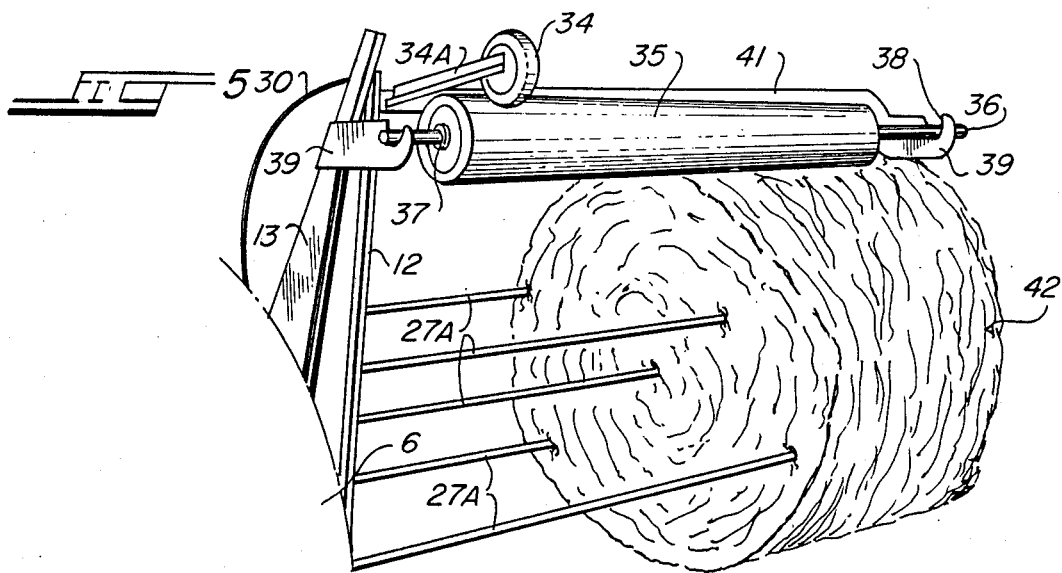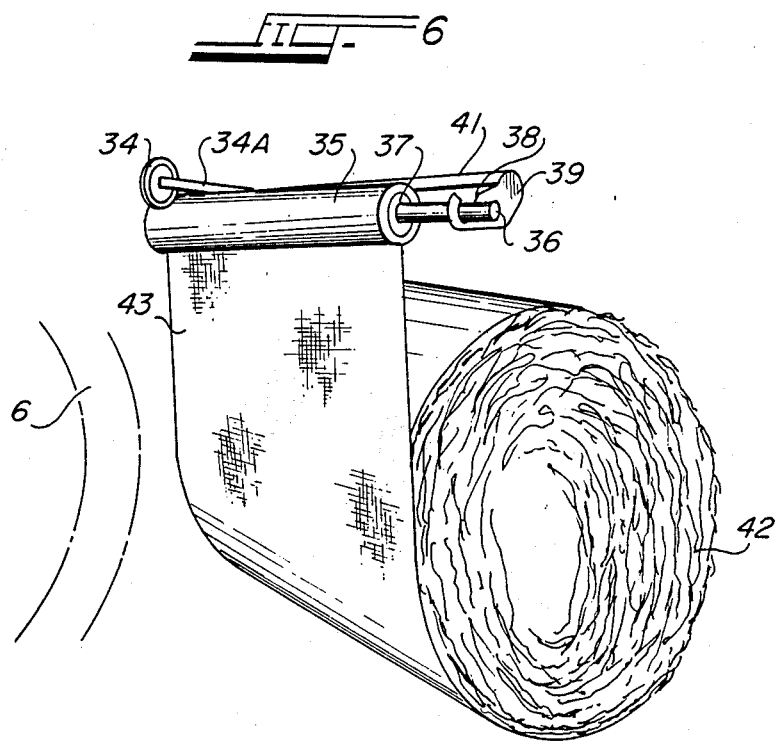

AGRICULTURAL BALE WRAPPER

BACKGROUND OF THE INVENTION

1. Field of the Invention

This invention pertains to agricultural bale wrappers and more particularly to an agricultural bale wrapper which may be attached to a 3 point hitch of a tractor and used to wrap plastic sheeting around large, round agricultural bales, such as bales of hay for the purpose of preserving the hay while it is stored in the field.

2. Description of the Related Art

Heretofore bales of hay that have been stored in the fields without protection have deteriorated due to weather. The deterioration results in a loss and thus some method of preserving the hay is desirous. The following U. S. patents are in the opinion of the inventor and upon advice of counsel the closest U. S. patent prior art of which the inventor is aware: Grocke, U.S. Pat. No. 3,621,638, Goss, U.S. Pat. No. 3,662,514, and Good, U.S. Pat. No. 4,594,836.

As can be seen by reference to the above prior art, none of the prior U.S. patents discloses a means to wrap round bales of hay with plastic sheeting. Good discloses a means to enclose cylindrical bales of agricultural products in long, plastic tubes. Goss and Grocke disclose bagging systems for products other than agricultural products. Reference is also made to the following printed publications: Farm Show Magazine, Volume 9, No. 6, at page 23, and Farm Show Magazine, Volume 10, No. 4, at page 3.

This magazine is published by Farm Show, 20088 Kenwood Trail, P. O. Box 1029, Lakeville, Minn., 55044. Note these publications disclose various types of bale wrappers that have recently been made. Note that the British and Australian bale wrappers require two men to operate them. Also note that the Vermeer bale wrapper stabs the bale by backing a trailer into it which makes the stabbing operation very difficult.

SUMMARY OF THE INVENTION

It is, therefore, an object of this invention to provide a bale wrapper which may be used in the field to easily and quickly wrap plastic sheeting around cylindrical bales of agricultural products.

It is a further object of this invention to provide an agricultural bale wrapper which may be easily transported from one location to another and used by attaching it to the 3 point hitch of a farm tractor.

It is a further object of this invention to provide an agricultural bale wrapper which may be operated by one person in the field.

It is a further object of this invention to provide an agricultural bale wrapper that wraps plastic sheeting around the bale in a tight fashion.

It is a further object of this invention to provide an agricultural bale wrapper that may be adapted to wrapping circular bales of agricultural products that are of various widths.

Further object of this invention will become apparent from the following drawing, description and claims.

BRIEF DESCRIPTION OF THE DRAWING

FIG. 1 is a perspective view of the agricultural bale wrapper.

FIG. 2 is a perspective view of the agricultural bale wrapper mounted on the 3 point hitch of a tractor and ready for use.

FIG. 3 is a plan view of the upper portion of the braking mechanism of the agricultural wrapper.

FIG. 4 is a plan view of that part of the agricultural bale wrapper that turns the agricultural bale.

FIG. 5 is a perspective view of the agricultural bale wrapper in position to stab an agricultural bale for wrapping.

FIG. 6 is a perspective view of the agricultural bale wrapper showing an agricultural bale that has been wrapped with plastic sheeting.

DESCRIPTION OF THE PREFERRED EMBODIMENT

The agricultural bale wrapper is comprised of a frame 1 having located thereon hitches 2 for attachment to a 3 point hitch 8 of a tractor 6. The frame 1 has a main plate 4 with bar sections 5 thereon that form the top hitch 2. Pins (unshown) are used to secure the bale wrapper hitches 2 to the 3 point hitch 8 of the tractor 6. Braces 5A are connected between bar sections 5 and the hitches 2 for further support. A cross brace 5B connects the bar sections 5.

A hydraulic motor 9 is fastened to the center of the bottom portion of the main plate 4. Tubular section 10 of the frame 1 extends from one of the bar sections 5 upwards to the braking mechanism 11. Brace 12 supports tubular section 10. Plates 13 give further support to the tubular section 10. Table 14 is attached to tubular section 10 near the bottom of the plates 13 and holds a hydraulic valve 15 operated by a hydraulic valve handle 15A. A pair of hydraulic hoses 16 run from hydraulic outlets (unshown) on the tractor 6 to the hydraulic valve 15. Another pair of hydraulic hoses 16A run from the hydraulic valve 15 to the hydraulic motor 9. The hydraulic hoses 16 and 16A are only shown in part.

Shaft 9A of the hydraulic motor 9 extends through the main plate 4. A small sprocket 18 is fastened to the shaft 9A of the hydraulic motor 9. A large shaft 19 is fastened to a circular plate 20. A housing 21 is mounted in the frame 1 and receives the large shaft 19. A spacer 22 separates the circular plate 20 from the housing 21 and a keeper 23 is fastened to the end of the large shaft 19 opposite the spacer 22. An appropriate greasing means is used to grease the surface of the large shaft 19 as it rotates in the housing 21. A large sprocket 25 is fastened to one side of the circular plate 20. A chain 26 connects the small sprocket 18 to the large sprocket 25. A 5 pronged stabbing mechanism 27 consisting of prongs 27A and crossed pieces 27B is fastened to the side of the circular plate 20 opposite the large sprocket 25.

The brake 11 is comprised of a brake handle 28 fastened to the tubular section 10 near the hydraulic valve 15. An adjusting mechanism 29 is located near the brake handle 28. The adjusting mechanism 29 attaches one end of a brake cable 30 to the brake handle 28. The opposite end of the brake cable 30 is attached to one end of a brake band 31. The other end of the brake band 31 is attached to a support 32. The brake band 31 wraps around a brake drum 33. The brake drum 33 is attached to a brake wheel 34. The brake wheel 34 is rotatably attached to a pivotable frame 34A by means of axel 34B. A hinge 34C is connected between the pivotable frame 34A and an arm 41. The pivotable frame 34A is thus pivotable around the hinge 34C. A compression spring 30A surrounding the brake cable 30 is inserted between the end of the brake band 31 that is attached to the brake cable 30 and a support 32A on the pivotable frame 34A so that when the brake handle 28 is released the brake band 31 will ride freely on the brake drum 33. A support 46 also attached to the pivotable frame 34A holds the end of the brake cable 30 that is attached to the brake band 31. A further support 46A attached to the tubular section 10 holds the brake cable 30 away from the tubular section 10.

A roll of plastic sheeting 35 is attached to a shaft 36 by means of bearings 37 at both ends of the roll of plastic sheeting 35. Keepers (unshown) hold the bearings 37 in place on the shaft 36. The bearings 37 are press fit into the ends of the roll of plastic sheeting 35. The shaft 36 is secured in grooves 38 located in bars 39. One bar 39 is fastened to the upper end of the tubular section 10. Arm 41 which is also attached to the upper end of the tubular section 10 holds a second bar 39 which supports the other end of the shaft 36. The shaft 36 is secured in the grooves 38 by pins 44 that fit through holes in supports 45 shown only in FIG. 3. A spring 40 attached between the pivotable frame 34A and the brace 12 holds the brake wheel 34 in contact with the roll of plastic sheeting 35. The friction between the brake drum 33 and the brake band 31 in interaction with pressure exerted by the spring 40 determines the resistance that the brake wheel 34 creates to the turning of the roll of plastic sheeting 35. The more resistance that is created by the brake wheel 34 to the turning of the roll of plastic sheeting 35, the tighter the plastic sheeting 43 is wrapped around the bale 42. The brake tension may be set in advance by means of the adjusting mechanism 29. The brake handle 28 may then be locked into place by a locking mechanism (unshown) to give the desired tension on the plastic sheeting 43 as it is wrapped onto the bale 42.

A tubular bar 47 fits in the tubular hole 48 and is used to support the bale wrapper in an upright position when it is not attached to a tractor as is shown in FIG. 1. Upon being attached to the tractor 6 through the 3 point hitch 8 the tubular bar 47 is removed from the tubular hole 48. A large eyelet 49 is attached to the tubular section 10 which is near the center of gravity of the agricultural bale wrapper. The eyelet 49 is used as a means to lift the agricultural bale wrapper into the bed of a pick-up truck and the like for transportation from one location to another.

In operation, the agricultural bale wrapper after being attached to the 3 point hitch 8 of a tractor 6 is backed into an agricultural bale 42, as shown in FIG. 5. This stabs the bale onto the 5 pronged stabbing mechanism 27. The bale 42 is then lifted off the ground and plastic sheeting 43 from the roll of plastic sheeting 35 is fastened onto one of the strings (unshown) which are found around the bale 42. The 5 pronged stabbing mechanism 27 is then caused to rotate by moving the hydraulic valve handle 15A one way or the other. The interaction between the hydraulic valve 15, the hydraulic motor 9 and the hydraulic system (unshown) of the tractor 6 causes the hydraulic motor shaft 9A to rotate. The hydraulic motor shaft 9A may be made to rotate in either direction by the hydraulic valve 15. Also the speed of rotation may be varied by the hydraulic valve 15. This causes the bale 42 to rotate by the interaction of the small sprocket 18, the large sprocket 25, the chain 26 and the 5 pronged stabbing mechanism 27. The plastic sheeting 43 is thus pulled off the roll of plastic sheeting 35 and wrapped around the bale 42 due to the rotation of the bale 42. The directions of rotation are shown by the circular arrows 24 in FIG. 2. The direction to be used is at the discretion of the operator. The resistance applied to the roll of plastic sheeting 35 by means of the braking mechanism 11 causes the plastic sheeting 43 to stretch, tightening the plastic sheeting 43 around the bale 42. After several turns of the bale 42 the plastic sheeting 43 is cut from the roll of plastic sheeting 35 and the cut end will adhere to the plastic sheeting 43 on the bale 42 due to a clinging effect of the plastic sheeting 43. The seam where the plastic sheeting 43 is cut may then be placed adjacent to the ground and the 3 point hitch 8 is lowered so that the bale 42 is lowered to the ground. The tractor 6 may then be driven away from the bale 42, separating the 5 pronged stabbing mechanism 27 from the bale 42 and the wrapping process is completed.

The agricultural bale wrapper and the tractor 6 to which it is attached may be operated by only one person. The person operating the tractor 6 and the agricultural bale wrapper first stabs the bale 42 to be wrapped and raises it off the ground. Then the operator climbs out of the tractor cab and positions himself near the hdyraulic valve 15. He thus is able to operate both the hydraulic valve 15 which will rotate the bale 42 and the brake handle 28. For additional braking effect the operator may place his other hand on the roll of plastic sheeting 35.

The size of the roll of plastic sheeting 35 may be varied in order to accommodate bales of different widths by merely removing the roll of plastic sheeting 35 from the shaft 36 and inserting a wider roll of plastic sheeting or a narrower roll of plastic sheeting as the occasion requires. To remove the roll of plastic sheeting 35 from the agricultural bale wrapper, the shaft 36 must be removed from the grooves 38. In order to do this, the pivotable frame 34A carrying the brake wheel 34 is pivoted upwards and is held off the roll of plastic sheeting 35 by a pivotable spacer (unshown) that may be attached to the arm 41. Pins 44 are then removed from the shaft 36 and the supports 45. The shaft 36 with the roll of plastic sheeting 35 thereon may now be removed from the grooves 38 and the roll of plastic sheeting 35 may be removed from the shaft 38 by removal of the bearings 37 from the roll of plastic sheeting 35 and the shaft 36. A new roll of plastic sheeting of a different width may then be placed on the shaft 36 and attached thereto by means of the bearings 37 and the shaft 36 reinserted in the grooves 38. Thus, different widths of agricultural bales may be wrapped.

I claim:
1. An agricultural bale wrapper comprised of
   a frame having located thereon hitches for attachment to a 3 point hitch of a tractor,
   a means fastened to the frame to stab and rotate an agricultural bale,
   a means fastened to the frame to support a roll of plastic sheeting,
   a brake handle fastened to the frame,
   a brake cable connected between the brake handle and a brake band,
   the brake band having two ends and being wrapped around a brake drum,
   the brake drum attached to a brake wheel,
   the brake wheel rotatably attached to a pivotable frame which is pivotable on an arm attached to the frame, a compression spring surrounding the brake cable and inserted between the end of the brake band attached to the brake cable and a support attached to the pivotable frame, a second support attached to the pivotable frame to which the other end of the brake band is attached, a spring attached between the pivotable frame and the frame, the brake wheel being in contact with the periphery of the roll of plastic sheeting.

2. An agricultural bale wrapper comprised of a frame having located thereon hitches for attachment to a 3 point hitch of a tractor, a means fastened to the frame to stab and rotate an agricultural bale, a shaft having removable bearings thereon which receive a roll of plastic sheeting, bars attached to the frame having grooves therein, the shaft being removably secured in the grooves in the bars, a brake handle fastened to the frame, a brake cable connected between the brake handle and a brake band, the brake band having two ends and being wrapped around a brake drum, the brake drum attached to a brake wheel, the brake wheel rotatably attached to a pivotable frame which is pivotable on an arm attached to the frame, a compression spring surrounding the brake cable and inserted between the end of the brake band attached to the brake cable and a support attached to the pivotable frame, a second support attached to the pivotable frame to which the other end of the brake band is attached, a spring attached between the pivotable frame and the frame, the brake wheel being in contact with the periphery of the roll of plastic sheeting.

3. An agricultural bale wrapper comprised of a frame having located thereon hitches for attachment to a 3 point hitch of a tractor, a hydraulic motor fastened to the frame, a hydraulic valve fastened to the frame, a pair of hydraulic hoses for connection between a hydraulic outlet on a tractor and the hydraulic valve, another pair of hydraulic hoses connected between the hydraulic valve and the hydraulic motor, the hydraulic motor having a rotating shaft that extends through the frame, a small sprocket fastened to the end of the rotating shaft of the hydraulic motor that extends through the frame, a large shaft fastened to a circular plate, a housing mounted in the frame which receives the large shaft, a large sprocket fastened to the circular plate, a chain connecting the small sprocket and the large sprocket, a multi-pronged stabbing mechanism fastened to the circular plate, a means fastened to the frame to support a roll of plastic sheeting, a brake handle fastened to the frame near the hydraulic valve, a brake cable connected between the brake handle and a brake band, the brake band having two ends and being wrapped around a brake drum, the brake drum attached to a brake wheel, the brake wheel rotatably attached to a pivotable frame which is pivotable on an arm attached to the frame, a compression spring surrounding the brake cable and inserted between the end of the brake band attached to the brake cable and a support attached to the pivotable frame, a second support attached to the pivotable frame to which the other end of the brake band is attached, a spring attached between the pivotable frame and the frame, the brake wheel being in contact with the periphery of the roll of plastic sheeting.

4. An agricultural bale wrapper comprised of a frame having located thereon hitches for attachment of a 3 point hitch of a tractor.

a hydraulic motor fastened to the frame, a hydraulic valve fastened to the frame, a pair of hydraulic hoses for connection between a hydraulic outlet on a tractor and the hydraulic valve, another pair of hydraulic hoses connected between the hydraulic valve and the hydraulic motor, the hydraulic motor having a rotating shaft that extends through the frame, a small sprocket fastened to the end of the rotating shaft of the hydraulic motor that extends through the frame, a large shaft fastened to a circular plate, a housing mounted in the frame which receives the large shaft, a large sprocket fastened to the circular plate, a chain connecting the small sprocket and the large sprocket, a multi-pronged stabbing mechanism fastened to the circular plate, a shaft having removable bearings thereon which receive a roll of plastic sheeting.

bars attached to the frame having grooves therein, the shaft being removably secured in the grooves in the bars, a brake handle fastened to the frame near the hydraulic valve, a brake cable connected between the brake handle and a brake band, the brake band having two ends and being wrapped around a brake drum, the brake drum attached to a brake wheel, the brake wheel rotatably attached to a pivotable frame, a compression spring surrounding the brake cable and inserted between the end of the brake band attached to the brake cable and a support attached to the pivotable frame, a second support attached to the pivotable frame to which the other end of the brake band is attached, a spring attached between the pivotable frame and the frame, the brake wheel being in contact with the periphery of the roll of plastic sheeting.

* * * * *